Oct. 18, 1938.  F. W. CALDWELL  2,133,656
ONE-WAY DRIVE FOR PROPELLERS
Filed April 23, 1936  4 Sheets-Sheet 1

INVENTOR.
Frank W. Caldwell
BY Harris G. Luchu
ATTORNEY

Oct. 18, 1938.  F. W. CALDWELL  2,133,656
ONE-WAY DRIVE FOR PROPELLERS
Filed April 23, 1936  4 Sheets-Sheet 2

INVENTOR.
Frank W. Caldwell
BY
ATTORNEY

Oct. 18, 1938.   F. W. CALDWELL   2,133,656
ONE-WAY DRIVE FOR PROPELLERS
Filed April 23, 1936   4 Sheets-Sheet 4

INVENTOR.
Frank W. Caldwell
BY Harris G. Luther
ATTORNEY

Patented Oct. 18, 1938

2,133,656

UNITED STATES PATENT OFFICE 2,133,656

ONE-WAY DRIVE FOR PROPELLERS

Frank W. Caldwell, Hartford, Conn., assignor to United Aircraft Corporation, East Hartford, Conn., a corporation of Delaware Application April 23, 1936, Serial No. 76,036

1 Claim. (Cl. 170—163)

This invention relates to propeller drives and has particular reference to a one-way, or a free wheeling drive for a controllable pitch aeronautical propeller.

An object of the invention resides in the provision of a suitabe one-way drive between the propeller and the engine so that under certain circumstances the propeller may rotate freely with respect to the engine, and the pitch of the propeller blades may be maintained at a value such that the propeller will offer the minimum resistance to the progress of the airplane upon which it is mounted, or, in other words, will give the minimum drag during such free rotation.

A further object resides in the provision between a controllable pitch propeller and the propeller driving engine of a drive effective to transmit the power of the engine to the propeller in a direction to convert the engine horsepower into propulsive effort by the propeller, and which at the same time will permit the propeller to rotate freely under the influence of aerodynamic forces with respect to the engine in the same direction at a speed greater than the speed of the engine.

Other objects and advantages will be more particularly pointed out hereinafter or will become apparent as the description proceeds.

In the accompanying drawings in which like reference numerals are used to designate similar parts throughout, there is illustrated a suitable mechanical embodiment of one form of the idea of the invention. The drawings, however, are for the purpose of illustration only and are not to be taken as limiting the invention.

In the drawings, Fig. 1 is an elevational view of a fragmentary portion of an engine, a propeller and a propeller drive constructed according to the idea of this invention, certain portions being broken away and shown in section to better illustrate the construction thereof. This figure also includes a fragmentary illustration of a suitable manually adjustable governor for controlling the controllable pitch propeller.

Figure 1:
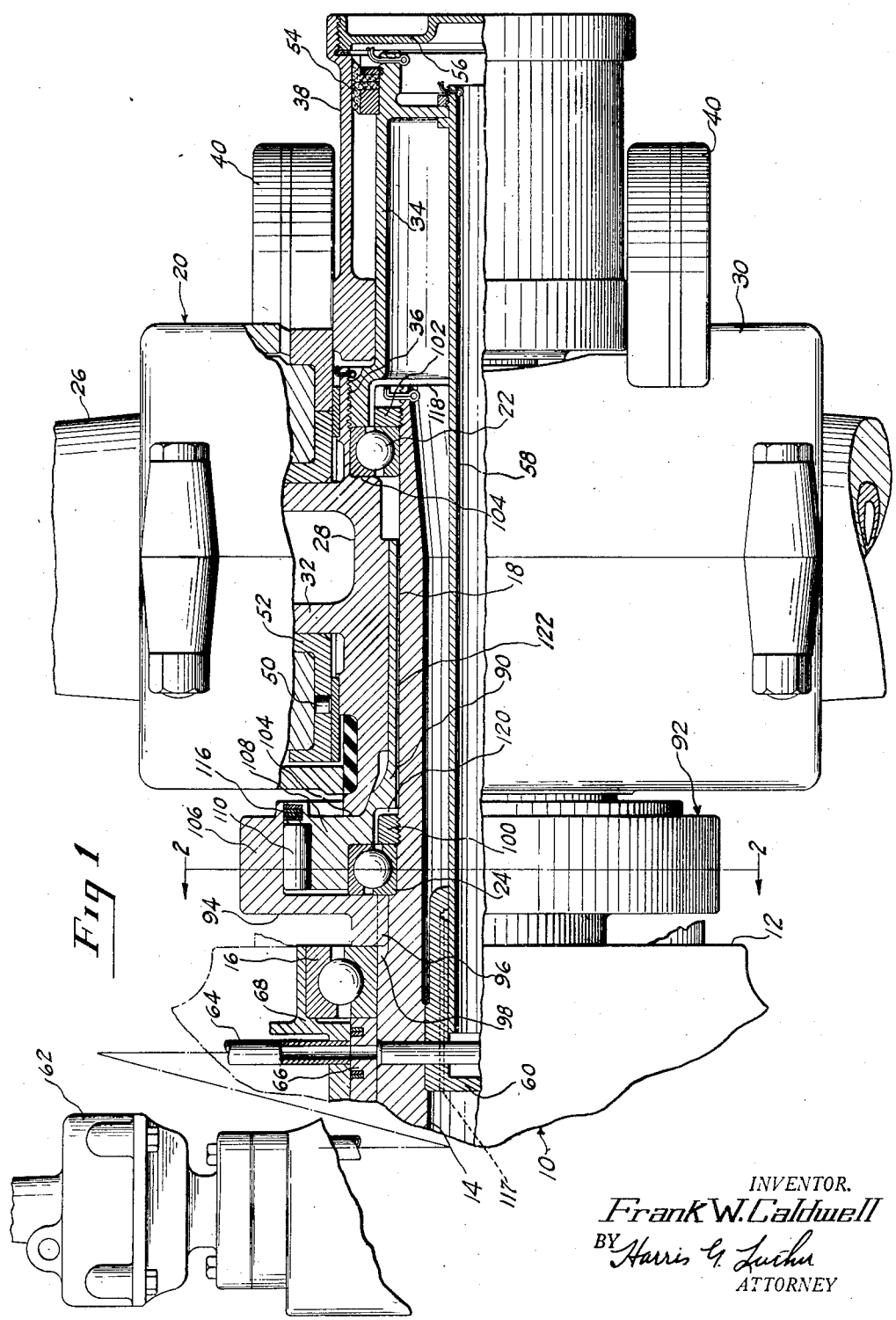

Referring to the drawings in detail, the numeral 10 generally indicates a suitable propeller driving engine which may be a radial air-cooled internal combustion engine frequently employed for the propulsion of airplanes, but may be any other suitable propeller drive power plant without in any way exceeding the scope of the invention. The engine illustrated is provided with a nose section 12 through which extends an engine drive shaft 14. The drive shaft 14 is tubular in construction and is supported in the nose piece 12 by an anti-friction bearing 16 which centers the shaft with respect to the nose piece and also transfers the propeller thrust to the engine and the airplane upon which the engine is mounted.

Forwardly of the nose section 12 the drive shaft 14 is provided with a cylindrical portion 18 upon which is mounted the controllable pitch propeller generally indicated at 20, the propeller being supported upon and centered with respect to the drive shaft by means of a pair of spaced apart anti-friction bearings 22 and 24.

The propeller blades 26 are secured upon a propeller hub portion or spider member 28 by means of a two-part barrel member 30 in such a manner that the blades are rotatably mounted upon the respective radially extending arms 32 of the hub portion. Thus the blades may be rotated about their respective longitudinal axes to change the pitch angle of the blades.

A suitable hydraulic mechanism is provided for moving the blades in one direction of pitch angle adjustment and suitable centrifugally actuated means are provided for moving the blades in the opposite direction. In the hydraulic pitch changing mechanism illustrated, a relatively fixed piston 34 is mounted upon the forward end of the hub member 28 by suitable cooperating screw threads 36 and carries upon the exterior thereof a reciprocable cylinder 38, the rearward end of which is operatively connected with the counterweights 40 by means of a suitable cam and pin connection particularly illustrated in Fig. 3, the cam being designated by the numeral 42 and the pin by the numeral 44. The counterweights 40 are mounted upon outwardly extending counterweight arms 46 which are non-rotatably secured to the root ends of the blades 26 by means of integral ring portions 48 and vernier pin connections 50. In the form of propeller illustrated, the ring portion 48 is connected to a sleeve member 52 which is non-rotatably secured within the hollow base or root portion of the propeller blade. A suitable hydraulic seal 54 is provided between the outer end of the piston member 34, and the head 56 of the cylinder so that the introduction of fluid under pressure into the space between the forward end of the piston and the cylinder head will cause an outward movement of the cylinder which will be transferred to the counterweights 40 through the pin and cam connections between the cylinder and the counterweights and will be transmitted to the propeller blades by the counterweight arms 46 and pin connections 50. Upon a decrease in the pressure of the fluid between the piston 34 and cylinder 56, the counterweights 40 will move under the actuation of centrifugal force to rotate the propeller blades 26 and at the same time move the cylinder 38 toward its rearward position illustrated in Fig. 1. In one suitable form of propeller, the counterweights 40 are used to move the blades toward their high pitch condition and the cylinder 38 is used to overcome the action of the counterweights and move the blades toward their low pitch condition. The hydraulic fluid under pressure is supplied to the space between the forward end of the piston 34 and the cylinder head 56 through a tubular extension 58 mounted within the tubular forward end of the drive shaft 14 and secured at its rear end in a plug member 60 rigidly secured in the bore of the tubular drive shaft. The hydraulic fluid is supplied from some suitable pressure source such as a pump and is fed through the manually adjustable speed controlling governor 62 and a conduit 64 leading from the governor to the interior of the plug 60, through a suitable oil collector ring 66 positioned between the rotatable drive shaft and a fixed portion 68 of the engine.

Figure 3:
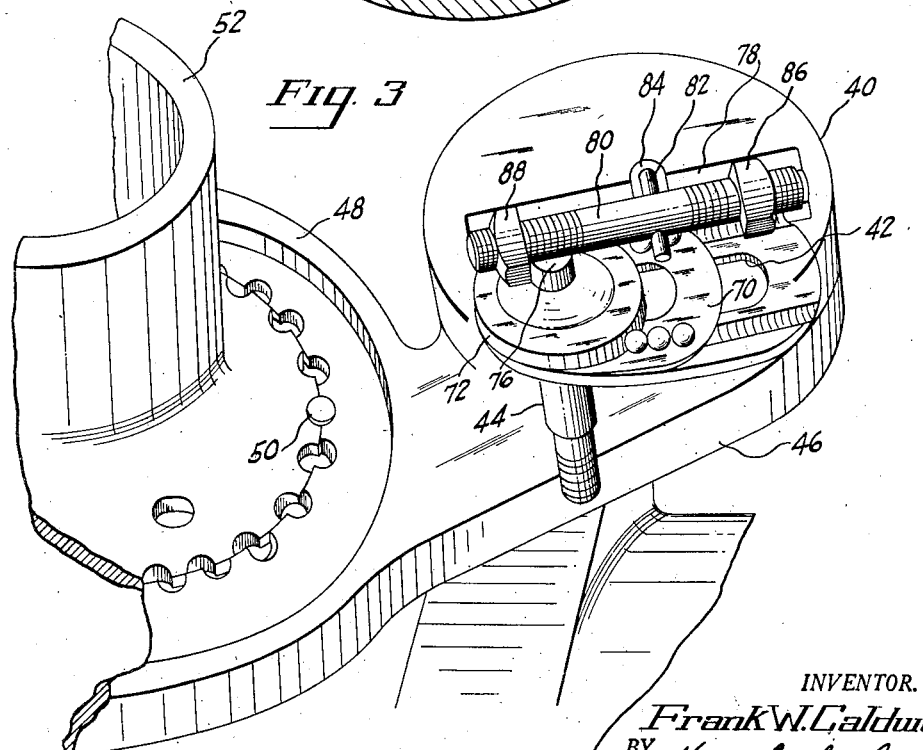
Fig. 3 is a fragmentary perspective view of certain portions of the propeller particularly illustrating one of the counterweights illustrated in Fig. 1, and the limit stop mechanism included in the counterweight for determining the range of pitch change of the propeller blades.

Referring to Fig. 3, it will be observed that each counterweight is provided with limit stops for determining the position of the propeller blades at each end of the range of pitch adjusting movement of the blades. In the form of propeller illustrated, a flat anti-friction bearing 70 is disposed between the pin 44 and the counterweight 40, one race of this bearing comprising a disc shaped member 72 fixed upon the pin 44 adjacent to the end thereof remote from the cylinder 38. Above the disc 74, the pin is provided with an upward extension 76. The counterweight is provided with a longitudinal slot or trough 78 within which there is disposed a cylindrical member 80 provided with external screw threads adjacent its ends and provided intermediate its length with a transverse pin 82 which extends into suitable extensions 84 of the trough 78 to secure the cylindrical member against rotation and longitudinal movement with respect to the counterweight. A nut 86 is screw threaded upon one end of the cylindrical member 80 and a similar nut 88 is screw threaded upon the opposite end thereof, both nuts 86 and 88 being maintained in adjusted position upon the cylindrical member by contact of their sides with the sides of the trough 78 and being so positioned that the extension 76 upon the pin 44 will come in contact with a respective one of the nuts 86 and 88 at each end of the range of movement of the respective propeller blades. Thus, by reason of the contact of the extension 76 with the limit stop nuts 86 and 88, the range of pitch changing movement of the propeller blades may be definitely selected and limited. For ordinary operation this range will fall somewhere within the range of pitch changing movement extending from approximately five degrees to approximately fifty degrees.

At its forward end the propeller hub member 28 is supported directly upon the outer race of the anti-friction bearing 22, but at its rearward end it is supported upon a cylindrical sleeve-like extension of an inner member 90 of a one-way clutch generally indicated at 92, the clutch member 90 being in turn supported upon the outer race of the anti-friction bearing 24. The outer member 94 of the one-way clutch is operatively secured upon the drive shaft 14 by means of suitable splines 96 which engage with similar external splines 98 provided upon the drive shaft immediately forwardly of the anti-friction bearing 16.

The propeller is definitely located upon the drive shaft 14 by means of a nut 100 which clamps the inner race of the anti-friction bearing 24 against a radial annular shoulder provided on the drive shaft and a nut 102 which bears against the inner race of the anti-friction bearing 22, the outer race of which bears against a suitable annular shoulder 104 provided within the hub portion 28 of the propeller, the rear end of the propeller hub member bearing against the inner clutch member 90 as indicated at 104, and the clutch member in turn bearing against the outer race of the anti-friction bearing 24. Also the outer race of the bearing 22 is fixed within the hub portion and restrained against movement in either direction by reason of the fact that the rearward end of the piston 34 which, as explained above is screw threaded into the forward end of the hub member, bears against the forward side of the outer race and clamps it rigidly against the annular shoulder 104. An additional restraint against axial movement of the propeller and drive shaft with respect to the engine is obtained by permitting the outer race of the anti-friction bearing 24 to bear against the forward side of the outer clutch member 94 and permitting the rearward side of this outer clutch member to bear against the forward side of the inner race of the main roller bearing 16.

The outer one-way clutch member 94 is provided with a forwardly extending annular portion 106 which overlies a corresponding annular portion 108 of the inner clutch member 90. A plurality of rollers 110 are disposed between these two annular portions and located in suitable depressions provided in the periphery of the inner clutch member to provide a one-way or free wheeling drive between the outer and inner clutch members as particularly illustrated in Fig. 2.

Figure 2:
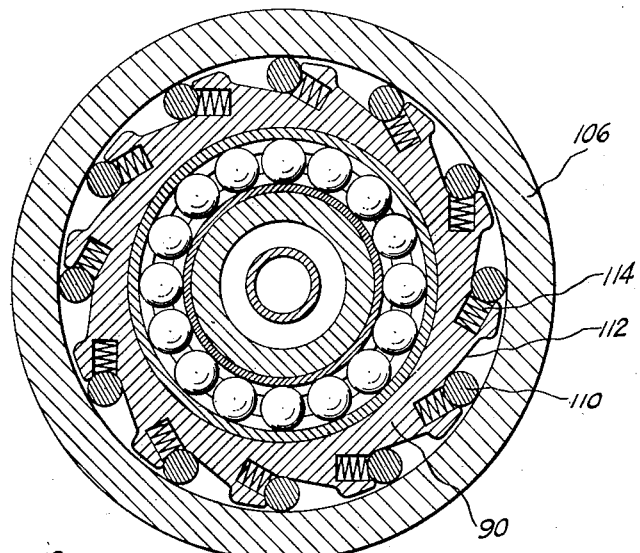
Fig. 2 is a sectional view on the line 2—2 of Fig. 1.

In the form of one-way clutch illustrated in Fig. 2, each of the rollers 110 is received in an individual depression 112 provided in the periphery of the inner clutch member 90. The bottom of each of the depressions 112 is sloped upwardly from a tangent to the arc of the medial depth of the depressions so that as the rollers move in the depressions in a counterclockwise direction as indicated in Fig. 2, they will become tightly wedged between the bottoms of the depressions and the inner surface of the overlying annular portion 106 of the outer clutch member 94 and will in this condition provide a driving connection between the outer and inner clutch members. If, however, due to a change in the speed of the outer clutch member, the inner clutch member tends to drive the outer clutch member, the rollers will be moved backwardly into the deep ends of the depressions 112 and the driving connection between the two clutch members will be broken so that the inner clutch member may rotate freely with respect to the outer clutch member in the same direction of rotation at a greater speed. One or more coiled compression springs 114 are provided in connection with each of the rollers 110 to resiliently urge the rollers toward the shallow end of the respective depressions so that a driving connection will be made as soon as the outer clutch member tends to drive the inner clutch member.

A suitable oil seal 116 is provided between the coextensive annular portions of the inner and outer clutch members and oil is fed to the clutch through a channel 117 in the plug 60 and from the shaft 14 through suitable channels 118, the annular channel 120, and the anti-friction bearing 24, an annular space 122 being provided between the sleeve portion of the inner clutch member 90, and the exterior of the cylindrical portion 18 of the drive shaft to the anti-friction bearing 22.

Figure 4:
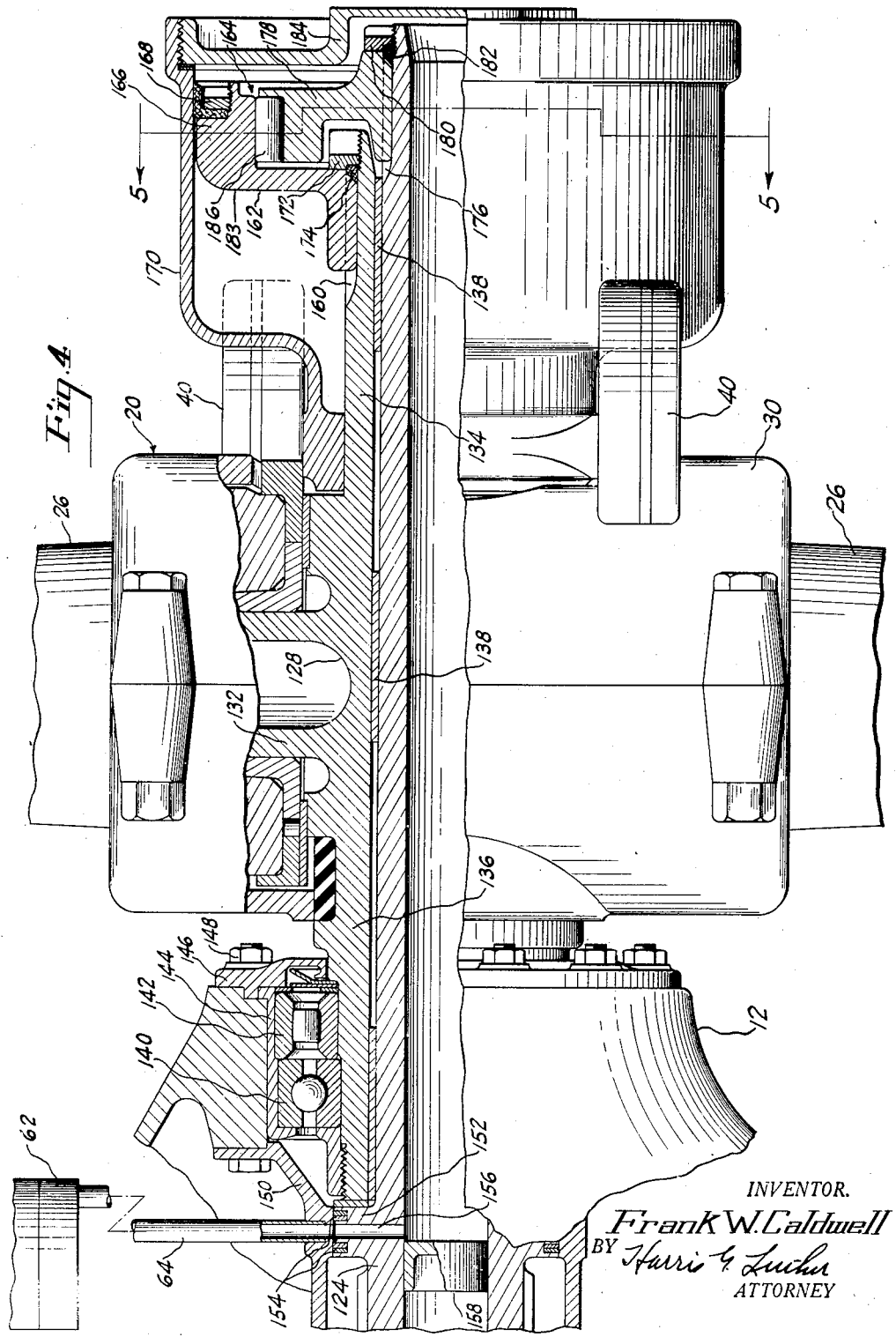
Fig. 4 is a view similar to Fig. 1 showing a somewhat modified form of the device of the invention.
Figure 5:
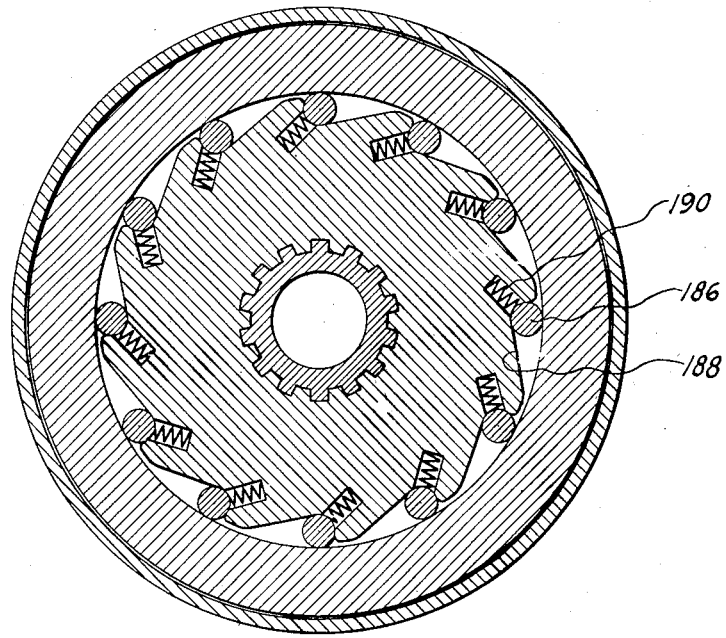
Fig. 5 is a sectional view on the line 5—5 of Fig. 4.

Referring now to the modified form illustrated in Figures 4 and 5, the drive shaft 124 is provided with a long tubular extension extending beyond the front side of the propeller. In this form of the invention the propeller hub member 128 is provided upon each side of the propeller supporting arms 132 with relatively long cylindrical extensions, the forward extension being indicated at 134 and the rearward extension being indicated at 136. The elongated hub member 128 is concentric with, and overlies the major portion of the length of the forward extension of the crankshaft, and bearings 138 are interposed between the outer surface of the drive shaft and the inner surface of the elongated hub member. At its rearward end the rear extension 136 of the hub member is received in the forward end of the fixed nose portion 12 of the engine and is supported therein by a pair of spaced apart anti-friction bearings 140 and 142, the bearing 140 being the usual centering and propeller thrust load carrying ball bearing and the bearing 144 being a roller bearing provided to assist in centering the propeller carrying hub 128 and also to support at least a portion of the propeller weight in cantilever reaction. The two bearings 140 and 142 are mounted in a cage 144 which is secured in the nose section 12 by means of the bearing cover 146 secured in place by the bolts 148. The bolts 148 also secure to the nose portion a fixed sleeve member 150 which surrounds the forward end of the drive shaft within the nose portion and forms a part of a suitable speed reduction gear, not illustrated, between the engine drive shaft and the propeller shaft 124. This fixed member 150 receives the lower end of the hydraulic fluid conduit 64 and within the portion of the fixed member which receives the oil conduit, the propeller shaft is provided with a radial extension 152 which bears against the inner surface of the sleeve member 150 and is provided with oil seal rings 154. An oil conduit 156 leads from between the rings 154 to the interior of the hollow propeller shaft 124 and a plug 158 is provided in the propeller shaft immediately rearwardly of the inner end of the conduit 156 so that provision is made for introducing hydraulic fluid under pressure from the manually adjustable governor 62 to the interior of the drive shaft 124.

At its forward end the forward extension 134 of the propeller hub member is provided with external splines 160 upon which is rigidly mounted the outer member 162 of a one-way clutch generally indicated at 164. This outer member 162 is provided with an interiorly splined sleeve portion which fits upon the forward end of the extension 134, with a radial flange portion and with an outer annular portion 166. This outer annular portion is provided with an oil seal 168 which bears against the inner surface of a cylinder 170 reciprocably mounted upon the member 162 and operatively connected with the counterweights 44 by pin and cam connections as illustrated in Fig. 3. The splines 160 are tapered and the member 162 is rigidly secured thereon by a nut 172 screw threaded upon the forward end of the extension 134, a packing 174 being interposed between the nut and the member 162 to prevent hydraulic fluid from leaking past the member 162 and flowing along the forward extension 134 of the hub member.

The drive shaft 124 is provided at its forward end with tapered external splines 176 and upon these splines there is rigidly mounted the inner member 178 of the one-way clutch 164, the member being rigidly secured upon the tapered splines by means of a nut 180 screw threaded upon the extreme forward end of the drive shaft. An oil seal 182 is provided between the nut 180 and the member 178 to prevent the leakage of hydraulic fluid between the member 178 and the shaft 124. Oil leaking through the clutch and into the space between the forward end of the extension 134 and the forward end of the shaft 124 is stopped by the forward bearing 138 between the drive shaft and the hub member. The piston is provided with a head 183 which forms a chamber between its inner surface and the members 162 and 178, into which hydraulic fluid may be introduced through the tubular drive shaft to cause the cylinder 170 to reciprocate and move the counterweight 40 to rotate the propeller blades 26 to various pitch angle positions.

The annular portion 166 of the outer clutch member 162 overlies the inner clutch member 178 and a plurality of clutch rollers 186 are disposed between the outer and inner clutch members. As particularly illustrated in Fig. 5, each of the rollers 186 is located in a cam shaped depression 188 provided in the periphery of the inner clutch member 178 and each roller is urged toward the shallow portion of the cam depression by one or more coiled compression springs 190.

With the above described modified construction, power is transmitted through the elongated drive shaft 124 to the inner clutch member 178 to rotate the same. When the inner member 178 rotates at a speed sufficient to transmit power from the inner member to the outer member 162, the rollers are moved out of the deeper portions of the depressions 188 and cammed between the bottoms of the depressions and the interior surface of the annular portion 166 of the outer clutch member 162 so that a drive is provided through the one-way clutch from the drive shaft 124 to the forward extension 134 of the propeller hub member 128 and from this hub member to the other elements of the propeller. The long tubular shaft 124 and the forward extension 134 on the propeller hub member provide a flexible resilient drive between the engine and the propeller which tends to damp out a large portion of the engine vibrations before they are transmitted to the propeller and the one-way clutch 164 provides a drive whereby the engine will drive the propeller in one direction of rotation and the propeller is free to overrun the engine in the same direction of rotation at a speed greater than the rotational speed of the drive shaft 124.

The automatic one-way drive provided between the engine and the propeller in the two modifications illustrated in the accompanying drawings and described above, may be utilized to serve two different purposes. The preliminary purpose of the device is for use on the engines of multi-motored aircraft. Most airplanes provided with a number of motors are able to maintain themselves in flight with less than the total number of motors provided and it at times becomes desirable to stop at least one of the motors. It may be that the total number of motors is provided for take-off and climb with load, and that when the airplane has reached its cruising altitude and leveled off at cruising speed, efficient operation may be achieved by stopping one or more of the motors and proceeding with only a part of the total number of motors in operation. It occasionally happens that one of the motors of the multi-motored airplane may fail in service, and thereby render it necessary to proceed with the remaining motors carrying the defective motor as a dead motor. In either case it is highly desirable that the drag of the dead motor be reduced to a minimum, and as the only alterable drag factor is the propeller drag, it becomes desirable to provide some means to achieve a propeller condition consistent with minimum negative thrust or drag.

One means which has been proposed for accomplishing this purpose is to feather the propeller blades, that is, turn the blades to such a pitch angle condition that the width of the blades is substantially parallel to the direction of motion. This condition, however, involves a great many difficulties, and a considerable amount of additional hazard, as it has been found that it is not always feasible to move the propeller blades through such a wide range of pitch angle adjustment as to bring the blades into and out of a feathered condition. Even disregarding the element of hazard, a very large, heavy, and expensive mechanism is necessary to move the blades through such a large angular range. It has been found that the same condition, and in many cases an even better condition of minimum resistance may be obtained by allowing the propeller to rotate freely in a condition of relatively high pitch, which is, however, not anywhere near a feathered condition. Thus in most instances a minimum drag condition can be obtained by allowing the propeller to free wheel at a pitch angle of some thirty to fifty degrees, in which case the negative thrust or drag of the propeller on the dead engine becomes practically negligible.

The other purpose which may be served by the invention is that of using the propeller as a brake to slow down the speed of an airplane during landing or maneuvers involving long dives. In this case the invention would apply to a single engine as well as to a multi-engine airplane. It has been found that the drag or negative thrust of the propeller can be greatly increased by allowing the propeller to rotate freely at a relatively low pitch angle, the drag in some cases becoming substantially equivalent to that of the area of the entire propeller disc.

In the present invention a controllable pitch propeller is provided having adjustable limit stops as described above which are desirably set to limit the pitch angle of the propeller at the most advantageous value for one or the other, or both, of the above purposes. Thus each of the counterweights 40 is provided with two limit stops, one of which may be set to maintain the propeller at its most advantageous low pitch angle for braking purposes and the other of which may be set to maintain the propeller at its most advantageous high pitch angle for reducing the propeller drag. In case of engine failure with a consequent loss of pressure of the hydraulic fluid supplied to the propeller operating cylinder, the counterweights would automatically carry the propeller blades to their high pitch condition as ascertained by the upper limit stop and as the engine slowed down and stopped the propeller would continue rotating freely about the propeller shaft. Thus the drag of the propeller would be reduced to its minimum value and at the same time the propeller would be drivingly released from the engine so that it would not tend to continue rotating the engine with the danger of destruction of the engine in case of some mechanical failure. When the engine is slowed down for landing or for a dive, the pressure on the hydraulic fluid is maintained and under these conditions the pilot can control the speed governor so that the propeller is forced into and maintained in its low pitch condition. With the engine thus slowed down the propeller will rotate relative to the engine under the influence of aerodynamic forces due to the forward speed of the airplane, and if it is held in the flat or low pitch condition mentioned will serve as an effective brake to prevent excessive speed of the airplane during the landing glide or dive.

In any case the limit stops will be so positioned that when the propeller is free wheeling in either one of its limit conditions, that is either in positive high pitch, or positive low pitch, the pitch angle as determined by the limit stops will be out of the range of pitch angles which would give to the propeller an excessive rotational or dangerous tip speed while it is rotating freely under the influence of aerodynamic forces.

While there has been illustrated and described a suitable mechanical embodiment of what is now considered to be the preferred form of the idea of the invention and one modification thereof, it is to be understood that the invention is not limited to the particular mechanical embodiment so illustrated and described, but that such changes in the size, shape, and arrangement of parts may be resorted to as come within the scope of the appended claim.

Having now described the invention so that others skilled in the art may clearly understand the same, what it is desired to secure by Letters Patent is as follows:

What is claimed is:

In a drive for a controllable pitch aeronautical propeller provided with hydraulically actuated means comprising a piston and cylinder device located at the front of said propeller for moving the propeller blades in one direction of pitch changing adjustment, and centrifugally actuated means for moving the propeller blades in the opposite direction of pitch changing adjustment, a one-way drive for said propeller whereby said propeller may rotate freely with respect to the propeller driving engine under the influence of aerodynamic forces whenever the speed of the engine falls below the speed imparted to said propeller by said aerodynamic forces, said piston comprising two concentric parts constituting an inner and an outer ring for said one-way drive, radial cams in at least one of said rings, and locking rollers between said rings.

FRANK W. CALDWELL.